Nov. 23, 1954  G. K. GUTTWEIN ET AL  2,695,211
RECORDING ACCELEROMETER
Filed May 31, 1951  2 Sheets-Sheet 1
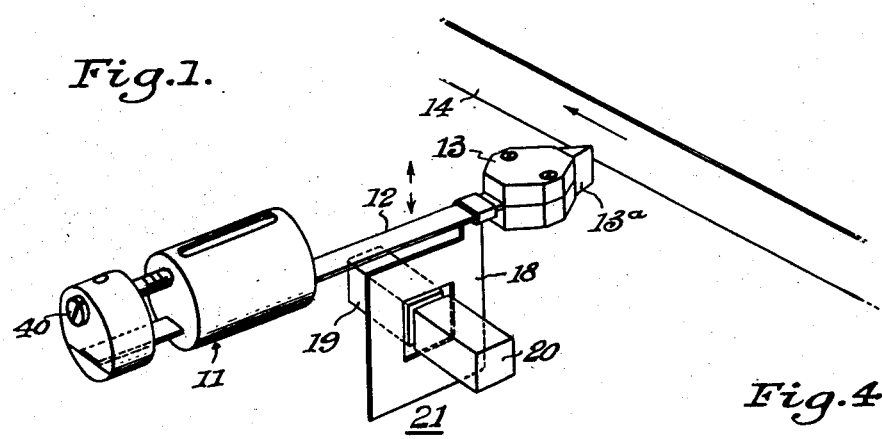
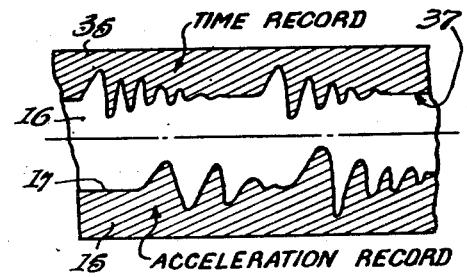
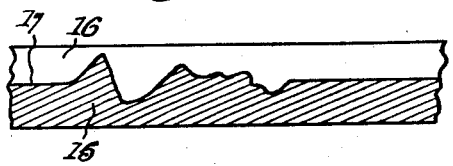
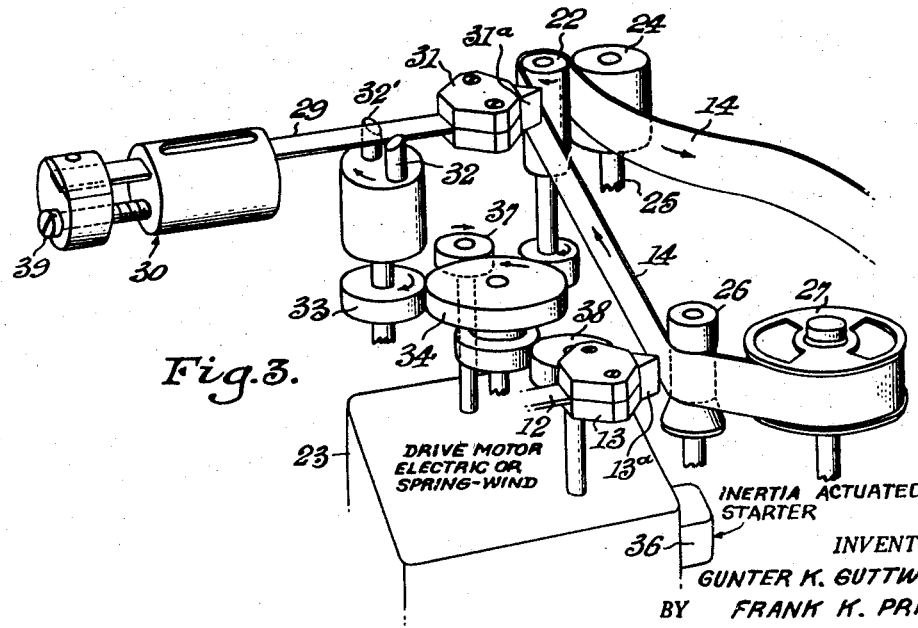
INVENTORS
GUNTER K. GUTTWEIN
BY FRANK K. PRIEBE
Harry M. Saragovitz
ATTORNEY

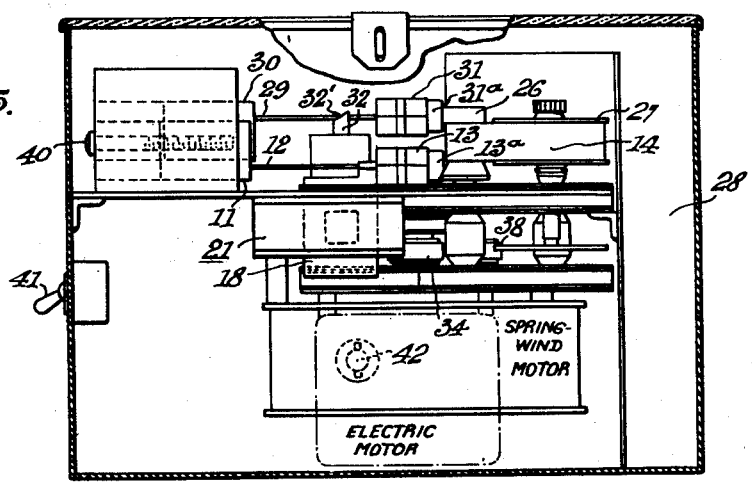
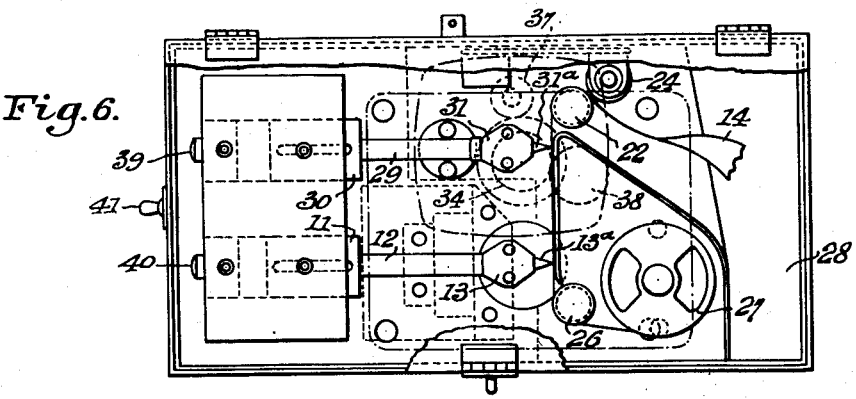
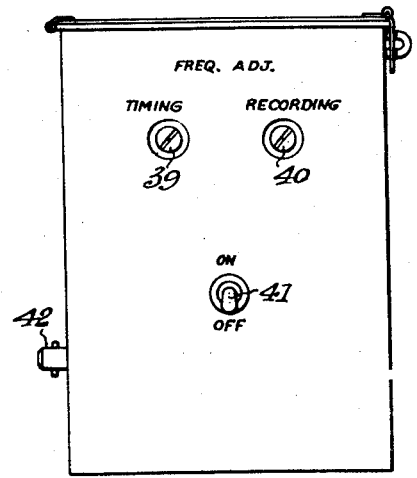
INVENTORS
GUNTER K. GUTTWEIN
FRANK K. PRIEBE
BY
*Harry M. Saragovitz*
ATTORNEY

2,695,211

RECORDING ACCELEROMETER

Gunter K. Guttwein, Long Branch, and Frank K. Priebe, Fairhaven, N. J., assignors to the United States of America as represented by the Secretary of the Army Application May 31, 1951, Serial No. 229,242

9 Claims. (Cl. 346—7)

(Granted under Title 35, U. S. Code (1952), sec. 266)

This invention may be manufactured and used by or for the Government for governmental purposes without the payment to us of any royalty thereon.

This invention relates to recording accelerometers of the seismic type.

An object of this invention is to provide a recording accelerometer in which the acceleration to which the system is subjected will be accurately reproduced on the recording medium.

The general theory of operation of seismic accelerometers is well known to those skilled in the art, being outlined in "Mechanical Vibrations," page 75, by Den Hartog, 3rd ed., 1947, published by McGraw-Hill. A spring-mounted mass moves relative to the supporting framework which is subject to vibration or acceleration. The reaction of the spring-mounted mass against the acceleration of the supporting framework will cause deflection of the spring. In a seismic accelerometer the natural frequency of the mass-spring system should be at least twice as high as the highest frequency of the accelerations to which the framework is subjected, in order for the deflection of the spring to represent with substantial accuracy the acceleration to which the system is subjected. Because an impure motion contains harmonics of frequencies higher than the fundamental, one of these frequencies may be very close to the natural frequency of the instrument. In order to avoid this difficulty an accelerometer is provided with suitable damping means, which may employ a fluid or a magnetic damper.

Heretofore, it has been customary to use a recording stylus and a wax paper record in accelerometers. However, since the amplitudes of vibration of the vibrating system are normally very small, in order to obtain a sufficient deviation of the tracing mark on the wax paper for an accurate record, it was necessary to employ a vibrating system having a low natural frequency. This requirement ran counter to the inherent requirement of any accelerometer of the seismic type that the vibrating mass-spring system have a natural frequency which is at least twice as high as the highest frequency of the accelerations to be recorded. In addition, an unknown and varying damping component was introduced in the recording system due to the friction between the stylus and the wax paper record.

These difficulties are overcome in the present invention by forming a magnetic trace on the recording medium. The recording stylus is in the form of a magnet which does not physically contact the recording medium. In response to the accelerations to be recorded the magnet moves transversely with respect to the direction of movement of the recording medium while being maintained substantially at the same distance therefrom.

A further advantage of the present invention lies in the fact that optical inspection of the recorded information is not necessary because a magnetic playback device transfers the recorded information into an electrical signal.

In the accompanying drawings, which are given by way of illustration only,

Figure 1 shows a schematic view of a portion of the invention, showing the relative positions of a spring-mounted magnet and a recording tape, Figure 2 illustrates a portion of the recording tape after the accelerations have been recorded thereon, Figure 3 is a schematic view of a recording system wherein both time and accelerations are recorded, Figure 4 shows a portion of the recording tape used in the system of Figure 3, with records of both time and accelerations formed thereon, Figure 5 shows one embodiment of the invention as a compact portable cased instrument, while Figures 6 and 7 show, respectively, top and side views of the device of Figure 5.

In Figure 1, 11 represents clamp means attached to the framework which is subjected to the accelerations to be recorded. A cantilever leaf spring 12 mounted in the clamp has a magnet 13 including a soft iron pole piece 13a which elements comprise the seismic mass attached to its free end. A tape 14 which is initially unmagnetized moves at a uniform speed in the direction indicated past the magnet 13. Tape 14 is formed with a magnetizable surface layer which is adapted to be influenced by the magnet 13 to form a record of the displacements of the seismic mass with respect to the tape, thereby to represent the displacements of the spring 12. Preferably, the front edge of pole piece 13a has a length substantially greater than one-half the width of tape 14.

In its undisplaced position, the pole piece 13a is immediately adjacent the lower half of the recording tape, but there is no physical contact between them. In this position the lower half of the recording tape will be magnetized due to the influence of magnet 13. In response to an acceleration, the mass of the magnet 13 (representing substantially the mass of the seismic system) reacts against the acceleration to deflect the leaf spring. Resultant movement of the magnet transverse of the recording tape causes a variable-width record on the tape, since as much of the magnet as is immediately adjacent the tape will cause the proximate portion of the tape to be magnetized.

The damping means may employ either a fluid damper, such as a dashpot utilizing either air or oil, or a magnetic damper. For convenience a magnetic damper 21 has been shown in Figure 1. A damping vane 18 comprising a thin plate of non-ferrous metal as, for example, aluminum, is clamped on cantilever leaf spring 12. To reduce the damping mass a central portion of vane 18 may be cut out as shown. In practice the damping means should be located at the extreme end of spring 12 adjacent the seismic mass where the relative displacement is greatest, however for clarity, vane 18 is shown somewhat displaced from this optimum location. Vane 18 passes between two adjacent poles of Alnico magnets 19, 20. If desired a laminated silicon steel yoke may be provided to secure better flux across the gap. The motion of vane 18 through the gap between the magnets induces eddy currents in itself, and these currents develop a damping force proportional to the velocity.

Figure 2 illustrates the resulting record. The shaded portion 15 on the tape represents the magnetized portion thereof, while the unshaded portion 16 is unmagnetized since it has not been immediately adjacent the magnet. Line 17 running down the middle of the tape shows the record formed when magnet 13 is in its undisplaced position. In that position, the pole piece edge is immediately adjacent the lower half of the tape so as to magnetize only that portion of the tape. In response to an acceleration, the magnet is displaced laterally relative to the tape so as to vary the width of the magnetized area thereon. During this entire process, the tape is moving at a constant rate of speed past the magnet. There is thus recorded on the tape a displacement curve proportional to the acceleration to which the system has been subjected.

In order to reproduce the recorded intelligence, the tape is fed through a conventional magnetic playback system. Such systems produce a voltage which is proportional to $dB/dt$, where B is the average recorded flux density. Thus, the output of such a playback system represents the differential of the recorded displacement curve. In order to produce the acceleration curve, it is only necessary to feed this output into a integrating circuit of conventional design.

Figure 3 indicates a recording accelerometer having provision for indicating a time record in addition to the accleration record. The recording tape 14, is drawn from spool 27 past pole piece 13a of the seismic mass at a constant rate by tape drive cylinder or capstan 22 which is driven through drive wheel 34 by the drive motor indicated generally at 23. For portable use, motor 23 may be a clock-work motor which operates with nearly constant speed or, optionally, a small electric motor may be provided for stationary use. The motor may be equipped with an inertia actuated starting means 36 which starts the device when a certain acceleration (e. g. 10 g,) has been surpassed. The tape 14 is pressed against capstan 22 by rubber wheel 24 of the spring loaded tape clamping idler 25. A guide roller 26 is provided to direct the tape which, after recording, is stored in receptacle 28, as shown in Figure 6.

It is sometimes important to record a time signal on the tape for comparing frequencies. This also may be done magnetically by using a reed gage on which a permanent magnet is attached. As shown in Fig. 3 a cantilever spring 29 secured by clamp means 30 in a manner similar to that shown for spring 12 in Figure 1 carries a permanent magnet 31 with its associated pole piece 31a. The timing device is actuated by a mechanical linkage from drive motor 23. As shown this may comprise a double cam 32, 32' driven through wheel 33. The cam faces periodically displace spring 29 from its position of rest adjacent the upper half of the recording tape and cause the magnet assembly 31, 31a to produce an additional timing wave record on tape 14. The record which will be obtained with the apparatus of Figure 3 is shown in Figure 4. In this case magnetic tape having approximately twice the width of that shown in Figures 1 and 2 should be used. Shaded portion 15 at the lower edge of the tape represents the portion magnetized in response to displacements of the seismic mass 13, 13a, while shaded portion 35 at the upper edge of the tape represents the portion magnetized in response to displacements of the timing means. Portion 16 is unmagnetized since neither of the magnets have been adjacent thereto. Line 17 shows the record formed when magnet 13 is undisplaced, and line 37 indicates the record when magnet 31 is at rest between displacements. The time record trace can be used in the play back system for an automatic control of the playback speed.

In one actual embodiment shown in Figures 5, 6 and 7, which is by way of illustration only and not by way of limitation, similar elements have been indicated by the same reference numerals as were used in the schematic views of the previous figures. Drive wheel 38 enables either the electric or spring wind motors to be used. Screws 39 and 40 allow initial adjustment of the natural frequency of the timing mass and the recording mass respectively. Switch 41 controls the electric motor and crank arm 42 allows the spring-wind motor to be wound from outside the accelerometer case. In the embodiment shown, a tape speed of five inches per second may be used and the timing device may be tripped at a frequency of five times per second.

What is claimed is:

1. A recording mass-spring accelerometer comprising, in combination, a magnetic seismic mass subject to displacement by accelerating forces, a second magnetic mass adjacent thereto and subject to periodic displacement by timing means, and a magnetizable recording medium located proximate to both said masses in a physically non-contacting relation therewith such that displacement of said masses produces on said medium adjacent magnetized records of the displacements of said masses.

2. A recording mass-spring accelerometer comprising, in combination, a magnetic seismic mass subject to displacement by accelerating forces, a magnetizable recording medium, normally inactive drive means for passing said medium past said mass at a constant rate in a physically non-contacting relation therewith and in a plane substantially parallel to that in which said mass may move, and inertia actuated means operative upon the application thereto of a predetermined acceleration force to activate said drive means.

3. A recording mass-spring accelerometer as set forth in claim 2 wherein said drive means comprises an electric motor.

4. A recording mass-spring accelerometer as set forth in claim 2 wherein said drive means comprises a clock-work motor.

5. A recording mass-spring accelerometer comprising, in combination, a magnetic seismic mass subject to displacement by accelerating forces, a second magnetic mass adjacent thereto and subject to periodic displacement, a magnetizable recording medium, drive means for passing said medium past both said masses at a constant rate in a physically non-contacting relation therewith and in a plane substantially parallel to that in which said masses may move, and timing means having a connection with said drive means to periodically displace said second magnetic mass, thereby to produce on said medium adjacent magnetized records of the displacement of said masses.

6. A recording mass-spring accelerometer comprising, in combination, a magnetic seismic mass located in a first plane and subject to displacements substantially normal to said first plane by accelerating forces, magnetic damping means cooperating therewith, a second magnetic mass spaced apart from said first mass in directions in both said first plane and normal to said first plane and subject to periodic displacements substantially normal to said first plane, a magnetizable recording tape, drive means for passing said tape at a constant rate in a physically non-contacting relation therewith past said magnetic masses in a plane substantially parallel to that in which said masses may move and in a direction parallel to said first plane, and means mechanically linked to said drive means to periodically displace said second magnetic mass, such that displacement of said masses produces on said tape spaced apart magnetized records of the displacements of said masses.

7. A recording mass-spring accelerometer comprising, in combination, a supporting framework which is to be subjected to accelerating forces to be recorded, a cantilever leaf spring supported thereby, a magnetic seismic mass attached to the free end of said spring, damping means for said seismic mass, a magnetizable recording tape, and means for passing said tape past the free end of said mass at a constant rate in a physically non-contacting relation therewith and in a plane substantially parallel to that in which said mass may move, the free end of said mass in its undisplaced position covering approximately one-half of the width of a transverse dimension of said tape and moveable transverse of said tape upon the application of said accelerating forces to cause the proximate portion of said tape to be subjected to a variable-width magnetization.

8. A recording accelerometer as set forth in claim 7 wherein said transverse dimension is one-half of the width of said tape, and including means for concurrently magnetically recording timing indicia on the other half of the width of said tape.

9. A recording accelerometer as set forth in claim 8 wherein said means for concurrently magnetically recording timing indicia comprises a second magnetic mass located proximate to and periodically movable transverse of said other half of the width of said tape to cause a variable width magnetization of the other half of said tape.

References Cited in the file of this patent

UNITED STATES PATENTS

| Number | Name | Date |
| --- | --- | --- |
| 1,011,322 | Clement | Dec. 12, 1911 |
| 1,697,166 | Davis | Jan. 1, 1929 |
| 2,393,069 | Rushing et al. | Jan. 15, 1946 |
| 2,561,476 | Lang | July 24, 1951 |
| 2,585,913 | Camras | Feb. 19, 1952 |